US008436976B2

US 8,436,976 B2

(12) United States Patent
Koishi

(10) Patent No.: US 8,436,976 B2
(45) Date of Patent: May 7, 2013

(54) DISPLAY DEVICE, FINDER DEVICE AND CAMERA

(75) Inventor: Hiroyuki Koishi, Tokyo (JP)

(73) Assignee: Nikon Corporation, Tokyo (JP)

( * ) Notice: Subject to any disclaimer, the term of this patent is extended or adjusted under 35 U.S.C. 154(b) by 657 days.

(21) Appl. No.: 12/528,644

(22) PCT Filed: Feb. 26, 2008

(86) PCT No.: PCT/JP2008/053258
§ 371 (c)(1),
(2), (4) Date: Aug. 26, 2009

(87) PCT Pub. No.: WO2008/105395
PCT Pub. Date: Sep. 4, 2008

(65) Prior Publication Data
US 2010/0097564 A1    Apr. 22, 2010

(30) Foreign Application Priority Data

Feb. 26, 2007  (JP) ................................. 2007-046112

(51) Int. Cl.
*G02F 1/13* (2006.01)
*G02F 1/1333* (2006.01)

(52) U.S. Cl.
USPC .............................. 349/201; 349/86; 349/196

(58) Field of Classification Search .................... 349/86, 349/183, 196, 201
See application file for complete search history.

(56) References Cited

U.S. PATENT DOCUMENTS

| 6,847,428 | B1 | 1/2005 | Sekiguchi et al. |
| 2006/0034603 | A1 | 2/2006 | Homma |
| 2006/0126001 | A1* | 6/2006 | Mi et al. ........................ 349/177 |
| 2006/0263079 | A1 | 11/2006 | Koishi |
| 2007/0009255 | A1 | 1/2007 | Iwane |
| 2008/0007952 | A1* | 1/2008 | Iwane ........................... 362/277 |
| 2010/0033785 | A1* | 2/2010 | Koishi ........................... 359/35 |

FOREIGN PATENT DOCUMENTS

| JP | 2004191415 A | 7/2004 |
| JP | 2006330103 A | 12/2006 |
| JP | 2007017695 A | 1/2007 |
| JP | 2007017788 A | 1/2007 |

(Continued)

OTHER PUBLICATIONS

English Abstract of WO0079338.

(Continued)

*Primary Examiner* — Edward Glick
*Assistant Examiner* — David Chung
(74) *Attorney, Agent, or Firm* — Cahn & Samuels LLP

(57) ABSTRACT

To provide a small-size display device of a simple structure which can perform both of superimpose display and finder field-of-view control.
[Means for Solving Problems]
A display device 20 includes a first optical material layer 26 which is arranged between a pair of transparent base plates 24a, 24b and transmits light coming from a one surface of the base plate to another surface, a area 32 arranged in the first optical material layer 26, available to output light L0 coming from a side surface between the pair of base plates through the another surface, and a second optical material layer 27 arranged between the pair of base plates 24a, 24b adjacent to the first optical material layer 26 and available to switch status of transmitting the light L1 coming from the one surface to the another surface, and a status of scattering the light L1 to output through the another surface, or a status of outputting the light L1 in a direction different from the light transmitted through the first optical material layer 26.

21 Claims, 13 Drawing Sheets

FOREIGN PATENT DOCUMENTS

| | | | |
|---|---|---|---|
| JP | 2007047578 | A | 2/2007 |
| JP | 2007047769 | A | 2/2007 |
| JP | 2008015125 | A | 1/2008 |
| WO | WO0079338 | A1 | 12/2000 |

OTHER PUBLICATIONS

English Abstract of JP2004191415.
English Abstract of JP2006330103.
English Abstract of JP2007017695.
English Abstract of JP2007017788.
English Abstract of JP2007047578.
English Abstract of JP2007047769.
English Abstract of JP2008015125.
English translation of International Preliminary Report on Patentability and Written Opinion in PCT/JP2008/053258.

\* cited by examiner

DISPLAY DEVICE, FINDER DEVICE AND CAMERA

This patent application is a U.S. national stage application of PCT international application PCT/JP2008/053258 filed on Feb. 26, 2008 which claims priority of Japanese patent document 2007-046112 filed on Feb. 26, 2007 in Japan.

TECHNICAL FIELD

The present invention relates to a display device, a viewfinder device and a camera available to exit vary of information with overlaying to incident light.

BACKGROUND ARTS

From conventional, a viewfinder to display so-called superimpose display has been known which displays various information such as a focus detecting area and the like in a viewfinder of a camera with locating on a subject image. On the other hand, a camera having a plurality of shooting mode which differs aspect ratio of shooting area such as a normal mode and a panorama mode. In the camera, a viewfinder device to perform a view control by displaying dimming light or mission of light for an area out of shooting is equipped.

Further, as a viewfinder device having both functions of superimpose display and viewfinder control (finder field-of-view control), for example, it is disclosed shown in Patent Document 1.

A viewfinder device shown in Patent Document 1 comprises two liquid crystal display devices composed of a liquid crystal display device to perform viewfinder control and a liquid crystal display device to perform superimpose display. An image displayed on said two liquid crystal display devices are led to one eyepiece lens finally, an image observed by a photographer becomes combination thereof wherein the superimpose display and the viewfinder control are coexisted.

However, since the viewfinder device shown in Patent Document 1 comprises two liquid crystal display devices, an optical system and an electric system corresponding thereto respectively becomes necessary, there were problems that a device becomes larger as well as more complex structure.

[Patent Document 1]
Japanese Patent Laid Open No. 10-186490

DISCLOSURE OF INVENTION

The present invention is made by considering these circumstances, a purpose of the invention is to provide a display device having small size and simple structure and is available to perform superimpose display and viewfinder control. Also, another purpose is to provide a viewfinder device and a camera wherein such a display device is utilized.

In order to achieve the above purposes, a display device according to the present invention comprises;
a first optical material layer arranged between a pair of transparent base plates and transmits light coming from one surface of said base plates to another surface,
an area arranged on said first optical material layer available to output the light coming from a side surface of said pair of base plates from said another surface, and
a second optical material layer arranged between said pair of base plates adjacent to said first optical material layer and available to switch a status to transmit light coming from said one surface to said another surface and a status for scattering the light so as to be outputted from said another surface in a direction different from the light transmitted through said first optical material layer.

Preferably, said second optical material layer is composed of an optical material different from said first optical material layer.

Preferably, said area comprises;
a refractive diffraction grating composed of a periodic constitution of a refractive index isotropic area and a refractive index anisotropic area in a polymer-dispersed liquid crystal, wherein;
said area is constituted to output light, which is coming from a side face of said pair of base plate, with light coming from a surface of said one surface, from said another surface, in a status that voltage is not applied.

Preferably, said second optical material layer is constituted to output the light, which is coming from said one surface, from said another surface with scattering, or to output a direction which is different from a light transmitting said first optical material layer, in a status that voltage is not applied Preferably, in the display device according to the present invention,
said refractive diffraction grating is formed that said refractive index isotropic area and said refractive index anisotropic area are alternately arranged as a banded status along with a first direction which is available to output light from a side face crossing with said first direction of said side face of said pair of base plate.

Preferably, the display device according to the present invention further comprises;
a lighting means to generate light coming into a side face of said pair of base plate.

In the display device according to the present invention,
said second optical material layer may be arranged not so as to come light from said lighting means.

Further, said second optical member may be arranged so as to come light from said lighting means to said first optical member layer after passing said second optical material layer.

Preferably, a timing of generating light by said lighting means and a switching timing of a status to said first optical material layer and said second optical material member may be are composed to be synchronized.

A viewfinder device according to the present invention comprises;
an optical device as set forth in any one of the above,
an eyepiece lens, and
an optical member to guide an object light coming from a surface of one of said base plates of said display device passing through to another surface.

A camera according to the present invention comprises a viewfinder device like this.

BEST MODE FOR CARRYING THE INVENTION

Below, the present invention will be explained based on embodiments shown in drawings.

FIRST EMBODIMENT

Figure 1:
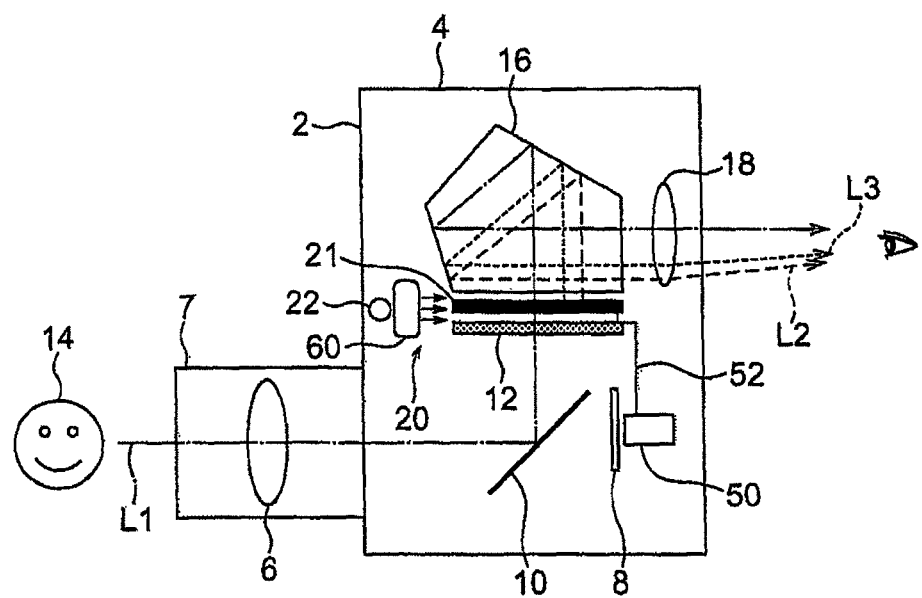
FIG. 1 is schematic view of a camera having a viewfinder device wherein a display device according to one embodiment of the present invention is equipped.

As shown in FIG. 1, a single lens reflex camera 2 according to one embodiment of the present invention has a camera body 4, a lens barrel 7 having a taking lens 6 is detachably attached to the camera body 4. As for the single reflex camera 2, it may be a film camera using silver film as a recording medium 8 or may be a single reflex digital camera wherein an image pick-up element such as CCD and CMOS and the like are used as a recording medium 8.

A quick return mirror 10 to reflect a subject light L1 from an object 14 to a finder optical system is provided between the taking lens 6 and the recording medium 8. Note that, although it is not illustrated, a shutter is provided between the recording medium 8 and the quick return mirror 10.

A viewfinder screen 12 is arranged at an optically conjugate position with an image combining surface of the recording medium 8, and the subject light L1 from the object 14 is reflected to the quick return mirror 10 so that an image is produced on the finder screen 12. Further, the subject image produced on the finder screen 12 and a liquid crystal display by a display element 21 are overlapped on the display element 21. The display element 21 will be specified below. A composite image produced on the display element 21 is observed by a photographer through a pentaprism 16 and an eyepiece lens 18. Note that, when photo-shooting, the quick mirror 10 is moved from light passage of the subject light L1 to out of the light passage so that the object image is produced on the recording medium 8.

A viewfinder device is contained in the camera body 4. The viewfinder device comprises the finder screen 12, the pentaprism 16, the eyepiece lens 18 and the display device 20. The display device comprises an optical element 21 and a light source 22.

The optical element 21 of the display device 20 is arranged adjacent to the finder screen 12. As for the optical element 21, a polymer-dispersed liquid crystal is used, more precisely, a complex liquid crystal display element is used wherein a diffraction type and a scattering type are combined. The light source 22 for lighting the optical element 21 is arranged at a lateral side of the optical element 21. As for the light source 22, for example, LED and the like are used.

Figure 2:
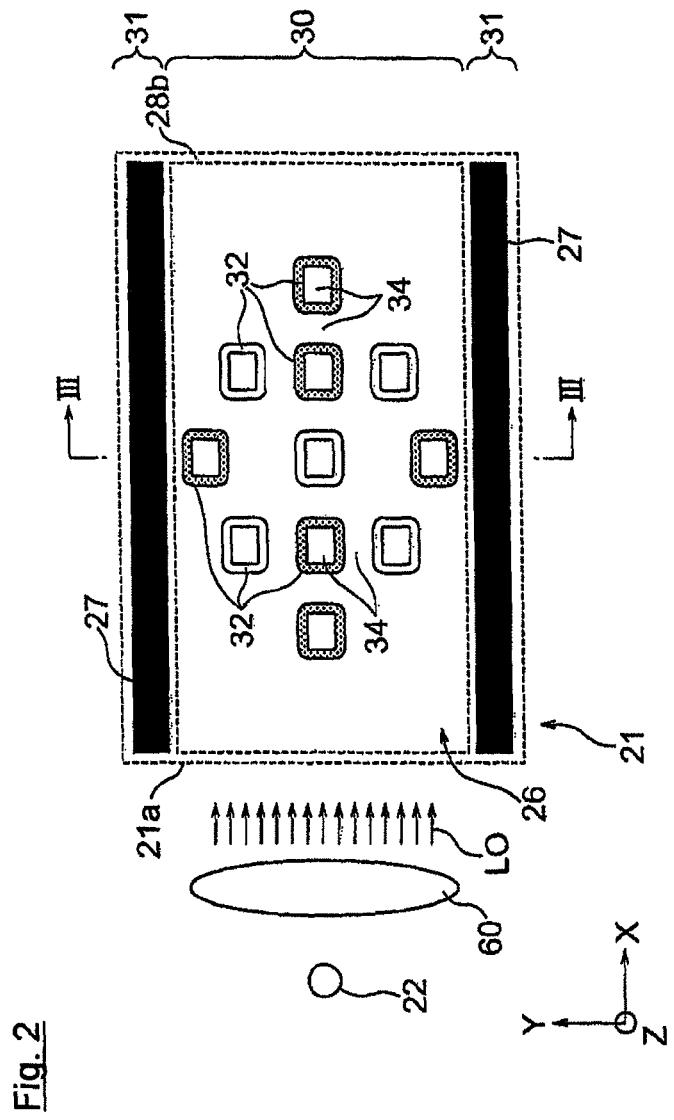
FIG. 2 is a schematic plane view in panorama mode of the display device shown in FIG. 1.
Figure 3:
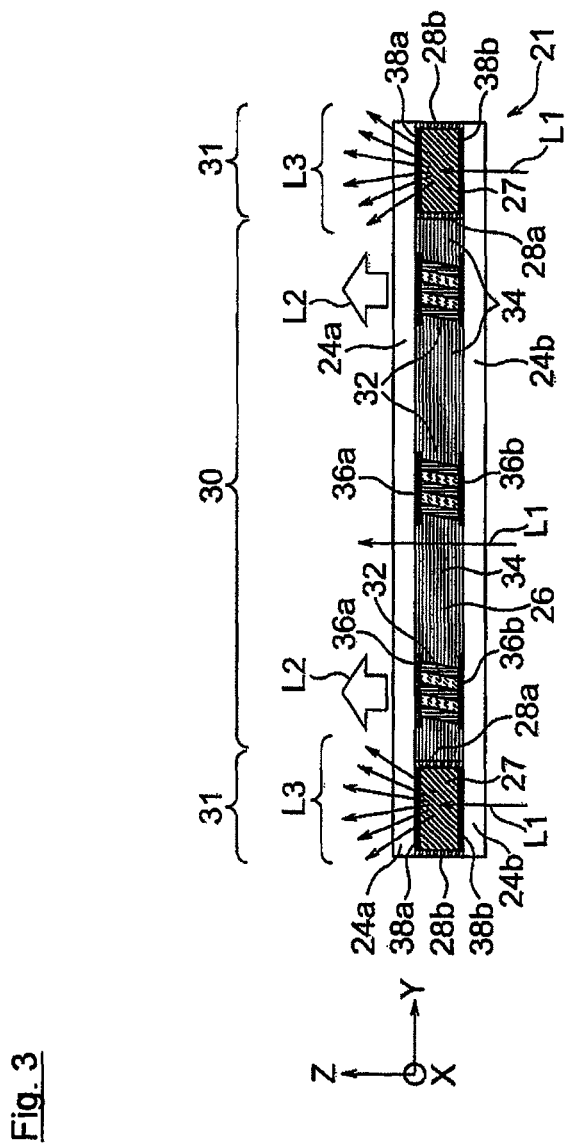
FIG. 3 is a cross sectional view along a line III-III of the display device shown in FIG. 1.

As shown in FIG. 2 and FIG. 3, the optical element 21 is a rectangular plate shape. Further, the plate shape is a laterally elongated rectangularly shape wherein a lateral direction X is longer with respect to a longitudinal direction Y of the plate shape. An elongation factor (aspect ratio) of the lateral direction X direction and the longitudinal direction Y length of the optical element 21 is set as an about identical to the aspect ratio of a scope of view of the normal mode.

At both sides of the longitudinal direction Y of the optical element 21, view control areas 31 are formed respectively. In a center portion sandwiched between the two view control areas 31, a normal viewing area 30 is formed. The aspect ratio of the normal viewing area 30 is set as an about identical to the aspect ratio of a scope of view of the panorama mode.

As shown in FIG. 3, the view control area 31 and the normal viewing area 30 are formed integrally by a first transparent base plate 24a and a second transparent base plate 24b facing thereto and sealing agent (preferably transparent) to seal an outer peripheral portion.

A second optical material layer 27, which is composed of a scattering optical element to switch transparent/scattering of the incident light by applying or not applying voltage, is formed on the view control area 31. At whole surfaces of inner surfaces of the transparent base plates 24a and 24b facing each other to sandwich the second optical material layer 27 in a 2-direction, transparent electrodes 38a and 38b are formed. Electric conduct of the transparent electrodes 38a and 38b are respectively controlled by a driving circuit 50 through a wiring 52 shown in FIG. 1, voltage application to the second optical material layer 27 is controlled in response to this.

Figure 5:
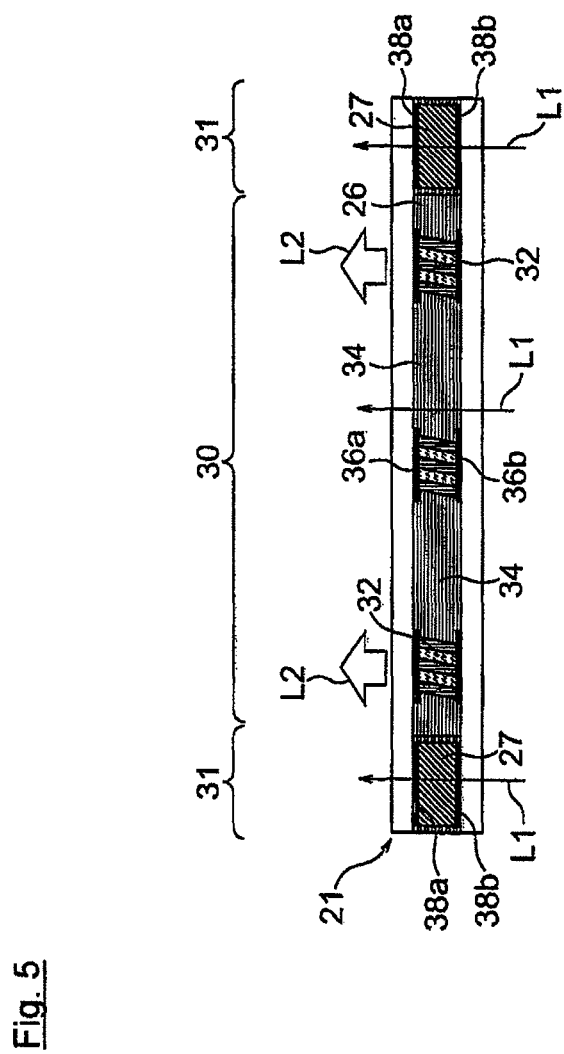
FIG. 5 is a cross sectional view along a line V-V of the display device shown in FIG. 4.

The second optical material layer 27 scatters the incident light in a status that voltage is not applied between the transparent electrodes 38a and 38b (FIG. 3). On the other hand, said layer 27 transmits the incident light in a status that voltage is applied between the transparent electrodes 38a and 38b (FIG. 5).

The first optical material layer 26 having a diffractive optical element to switch transmitting/diffraction the incident light by applying or not applying voltage is formed at the normal display area 30. As shown in FIG. 3, a display portion 32 and a non display portion 34 are arranged in the first optical material layer 26. In the display portion 32, a first transparent electrode 36a and a second transparent electrode 36b are respectively formed at inner surfaces of the respective base plates 24a and 24b facing each other.

These facing transparent electrodes 36a and 36b are formed as an identical shape and have a shape in response to a display configuration (characters and figures) of the display portion 32. In the present embodiment, as shown in FIG. 2, displaying configurations of the respective display portion 32 constitute about rectangular ring shape. These transparent electrodes 36a and 36b are connected with the driving circuit 50 through the wiring 52 shown in FIG. 1, and voltage application to the display portion 32 is controlled by the driving circuit. Note that, any one of the transparent electrode 36a or 36b may be whole surface electrode which is not patternized.

Figure 6:
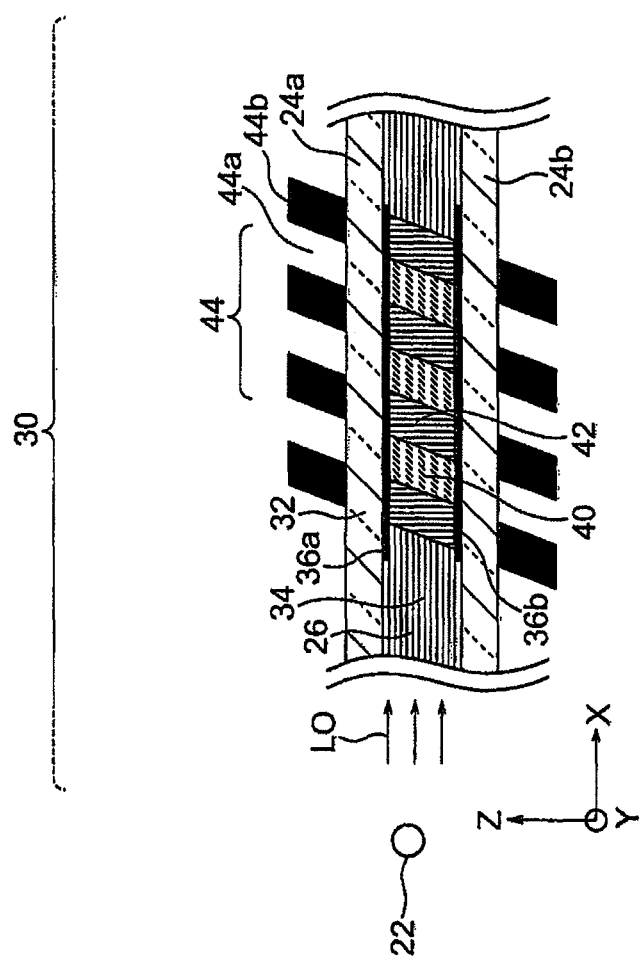
FIG. 6 is a schematic cross sectional view of a diffractive display device according to one embodiment of the present invention.

The display portion 32 of the first optical material layer 26 is a portion as being a liquid crystal hologram to which a diffractive optical element is applied. As shown in FIG. 6, in the display portion 32, a refractive index isotropic area 40 and a refractive index anisotropic area 42 form a multilayer structure having stripes repeated alternately to a progressive direction X of illuminating light L0 from the light source 22 along with a plane of the optical element 21.

In order to form such the multilayer structure, firstly, a blending liquid, which is a material having refractive index isotropic property (high polymer molecule monomer) and a material having refractive index anisotropic property (liquid crystal), is fulfilled into the normal display area 30 sandwiched between the transparent base plates 24a, 24b and the sealing agent 28a. Then, moire fringes 44 are formed by using laser beam and the like and said normal display area 30 is irradiated. At this time, masks are formed on the base plates 24a and 24b so as to not forming the moire fringes 44 on the non display portion 34.

The monomer is cured by photo polymerization, at this time, in moire fringe bright sections 44a where an optical intensity is being strong, a polymer layer is formed wherein monomer is cured.

Contrary, because a photo polymerization speed at moire fringe dark sections 44b, wherein optical intensity is weak, is slower than the photo polymerization speed at the moire fringe bright sections 44a, density of the liquid crystal becomes higher for a reason that monomer is pulled to an area where the optical intensity is strong (a portion where the photo polymerization speed is faster).

As a result, a multilayer laminate structure with the refractive index isotropic area 40 which consists of polymer and the refractive index anisotropic area 42 which consists of liquid crystal high density polymer is formed as an identical pattern with the moire fringes. Repeating pitch space of the multilayer laminate structure with the refractive index isotropic area 40 and the refractive index anisotropic area 42 is about 100 nm order and the like.

Although the voltage may be applied to the display portion 32 by the transparent electrodes 36a and 36b, the refractive index isotropic area 40 has an isotropic refractive index in spite of whether the voltage is applied or not. On the other hand, in the refractive index anisotropic area 42 wherein the liquid crystal is dispersed in the polymer, the liquid crystal orientation changes by whether the voltage is applied or not, and the refractive index changes too.

In a status that the voltage is not applied to the display portion 32, a liquid crystal refractive index and a polymer refractive index are different refractive indexes respectively so as to fulfill Bragg diffraction conditions against a light which incidents to a multilayer direction (X direction) of the display portion 32, such as the illuminating light L0 from the light source 32. Namely, in the status that the voltage is not applied, a refractive diffraction grating is formed at the display portion 32 wherein a layer having large refractive and a layer having small refractive are mutually arranged.

A diffraction condition at this time is being set as that the incident light L0 towards a positive direction of X from the light source 22, which comes into the first optical material layer 26, is diffracted at the display portion 32, and the diffracted light L2 thereof is diffracted to a direction toward a pentaprism 16 shown in FIG. 1 (in FIG. 6, a positive direction of Z).

On the other hand, when the voltage is applied to the display portion 32, an orientation of the liquid crystal in the refractive index anisotropic area 42 changes as well as the refractive index changes, the refractive index of the liquid crystal becomes equal to the refractive index of the polymer. As a result, the illuminating light L0 comes from the light source 22 into the first optical material layer 26 passes through the display portion 32 without generating said diffraction.

Note that, in the non-display portions 34, polymer and liquid crystal are dispersed with mixed and curing status, and the illuminating light L0 and the subject light L1 pass through the non-display portion 34.

FIG. 2 and FIG. 3 show displaying status of the displaying element 21 in the panorama mode. Because the voltage is not applied to the second optical material layer 27, the subject light L1 comes from a finder screen 12 to said layer 27 disperses. The subject light L1 exits as scatter light L3.

Therefore, view control areas 31 of display portion 32 are displayed as black or gray color by the second optical material layer 27, a photographer cannot visually recognize a subject image corresponding to the portion. As a result, the photographer can recognize only a normal viewing area 30 to be set as an about identical aspect ratio with the panorama mode as a viewing area.

Note that, collimate optics may be suitably arranged as a filter 60 between the optical element 21 and the light source. The collimate optics may change the illuminating light L0 of the light source as parallel bundle of rays against the X-axis, and may prevent infiltration of the illuminating light L0 to the second optical material layer 27. According to this, display of the view control area 31 may be closed to black color further without scattering the illuminating light L0 of the light source 22 in the second optical material layer 27. Also, since attenuation of the illuminating light L0 in the first optical material layer 26 is prevented, the following mentioned display by the display portion 32 becomes further legible.

In the normal display area 30, the voltage is applied to five display portions 32 in total, namely, one in a center and four on diagonal lines connecting four corners of elements 21 and the center of the arranged display portion 32 by the transparent electrodes 36a and 36b.

The five display portions 32 to which the voltage is applied transmit said illuminating light L0, and do not perform mark displaying since the diffracted light L2 is not formed.

Contrary to the above, the voltage is not applied to display portions 32 except said five display portion, and these display portions 32 form the refractive diffraction grating wherein layers having different refractive index are mutually stacked. Thus, these display portions 32 perform ring shape mark displaying by diffracting the illuminating light L0 towards the pentaprism direction (positive direction of Z) and outputting the diffracted light L2 wherein the illuminating light L0 comes from a short side face 21a of the display element 21 and passes through the non-display portion 34 and enters into these display portions 32.

Also, because the first optical material layer 26 constantly passes the subject light L1 from the finder screen 12, it becomes available to perform so called superimpose display, since it performs said mark displaying overlapping with the subject image.

Figure 4:
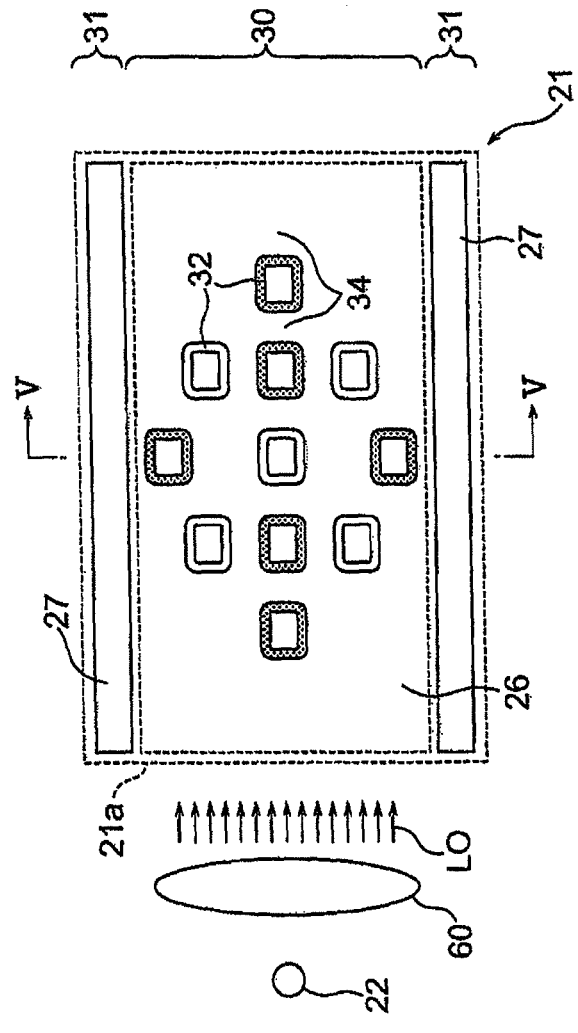
FIG. 4 is a schematic plane view in a normal mode of the display device shown in FIG. 1.

FIG. 4 and FIG. 5 show displaying status of the display element 21 in the normal mode. The voltage is applied to the second optical material layer 27 by the transparent electrodes 38a and 38b which sandwich the layer. Thus, the subject light L1 comes from the finder screen 12 to the optical material layer 27 passes through said optical layer 27 as similar with the subject light L1 entering into the first optical material layer 26.

Thus, the photographer can see the subject image at whole display element 21 through the view control area 31 and the normal display area 30. At this time, the photographer may recognize the whole display element 21 to be set as an about identical aspect ratio to the normal mode as a view scope.

Also, in the normal mode, the superimpose display may be performed in the first optical material layer 26 according to a method similar with at the time of the panorama mode, as shown in FIG. 4 and FIG. 5.

As mentioned above, the display device 20 according to the present invention realizes the both superimpose display and the viewfinder control by one display device. By making such constitution, the display device 20 according to the present invention may realize a display device having small size and simple structure even though having multi functions.

Also, a viewfinder device having the display device 20 according to the present invention has a function realized by two liquid crystal display in a conventional art, an optical and an electric system which are provided in response to respectively in the conventional art, are integrated as one. This contributes magnificently to downsizing and to simplify the constitution of the viewfinder device.

Further, by installing the display device according to the present invention, a camera having small size and multifunction can be realized.

SECOND EMBODIMENT

Figure 7:
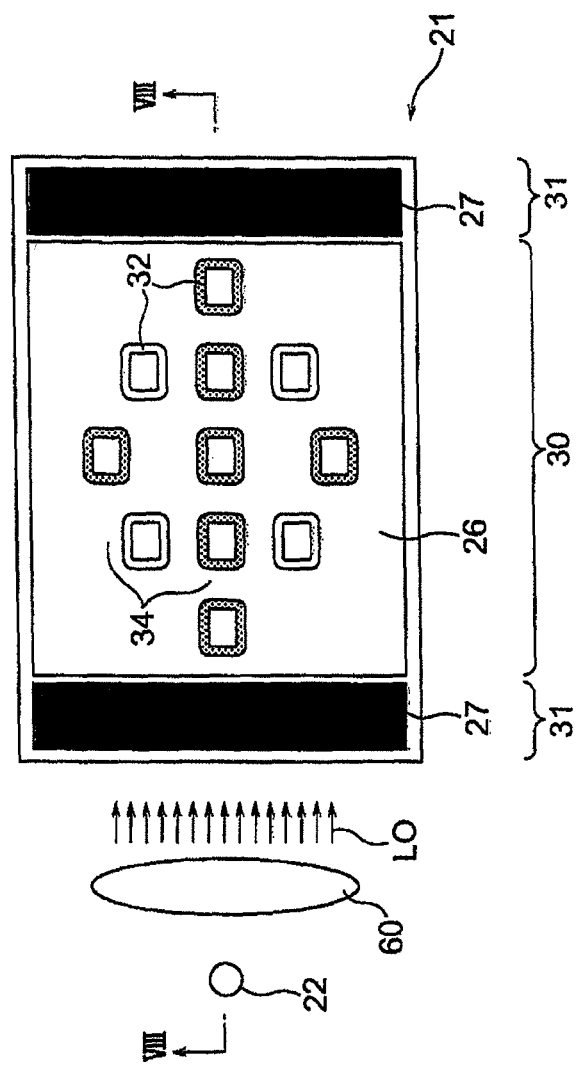
FIG. 7 is a schematic plane view of a display device according to another embodiment of the present invention.

In this embodiment, as shown in FIG. 7, it is constituted that an aspect ratio of a normal display area 30 corresponds to an aspect ratio of the view finder scope of the normal mode, an aspect ratio of whole optical element 21 corresponds to an aspect ratio of the view finder scope of the panorama mode respectively. Namely, it is different from the first embodiment at a point that the view control area 31 is arranged both sides of a lateral direction (the X-direction) of the optical element 21.

Also, it is different from the first embodiment at a point that the second embodiment further comprises a controlling means 54 so as to synchronize a genesis timing of the illuminating light L0 of the light source 22 and applying timing of driving voltage to the first optical material layer 26 and the second optical material layer 27. The other constitutions are similar with the first embodiment.

Figure 8:
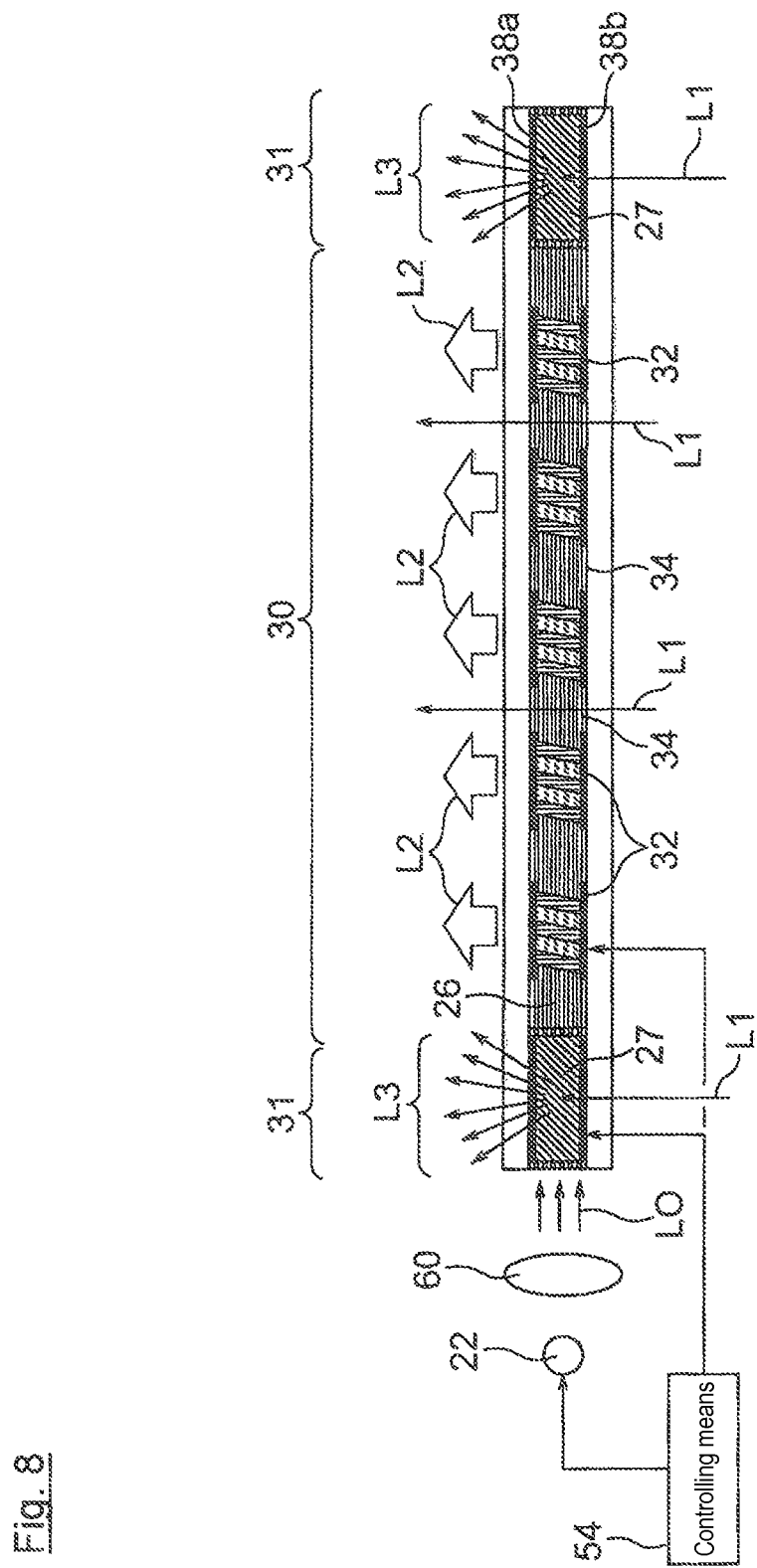
FIG. 8 is a cross sectional view along a line VIII-VIII of the display device shown in FIG. 7.

FIG. 7 and FIG. 8 show a displaying status of the display element 21 according to the second embodiment under the normal mode. In this embodiment, the illuminating light L0 comes into said first optical material layer 26 after passing through the second optical material layer 27. However, when the voltage is not applied to the second optical material layer 27, the illuminating light L0 from the light source 22 is scattered at the second optical material layer 27, and the most part thereof does not come to the first optical material layer 26. Therefore, in a status that the voltage is not applied to the second optical material layer continuously, the superimpose display cannot be made by the first optical material layer 26.

Consequently, in the present embodiment, this problem is solved due to control the lighting of the light source 22 and driving voltage application to the second optical material layer 27 by controlling means 54 as follows. Note that, the controlling means 54 is preferably equipped in a driving circuit 50 shown in FIG. 1.

Figure 9:
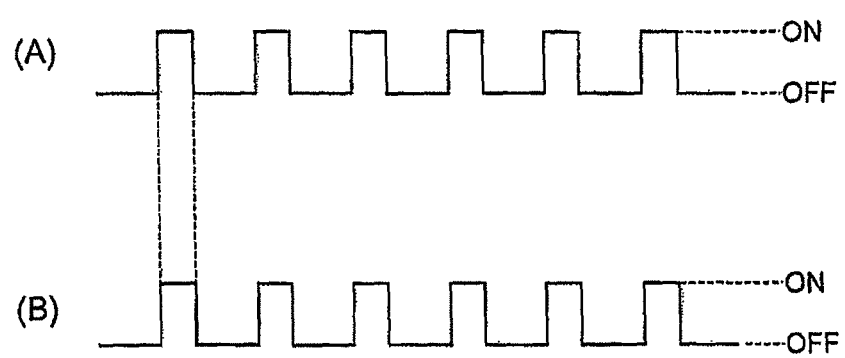
FIG. 9 is a schematic diagram showing light emission to a lighting device and timing pulse of applying voltage to a second optical material layer in the display device shown in FIG. 7.

FIG. 9 shows a generating timing pulse (A) of the illuminating light L0 of the light source 22 and a voltage applying timing pulse (B) to the second optical material layer 27. These pulses (A) and (B) are controlled by the controlling means 54. The light source 22 lights in a status the pulse (A) is ON and turn off the light in a status the pulse is OFF. In a status the pulse (B) is ON, the voltage is applied to the first optical material layer, and the voltage is not applied in a status OFF. Said timing pulse (A) and said timing pulse (B) are synchronized.

Frequencies of the each timing pulse (A), (B) are set to a high speed that blinking of the display portion 32 by switching the light on and off cannot be recognized by human eyes. Specifically, it is preferable to set a value excess 50 to 60 KHz which is a limiting value of a human eye response frequency.

Figure 10:
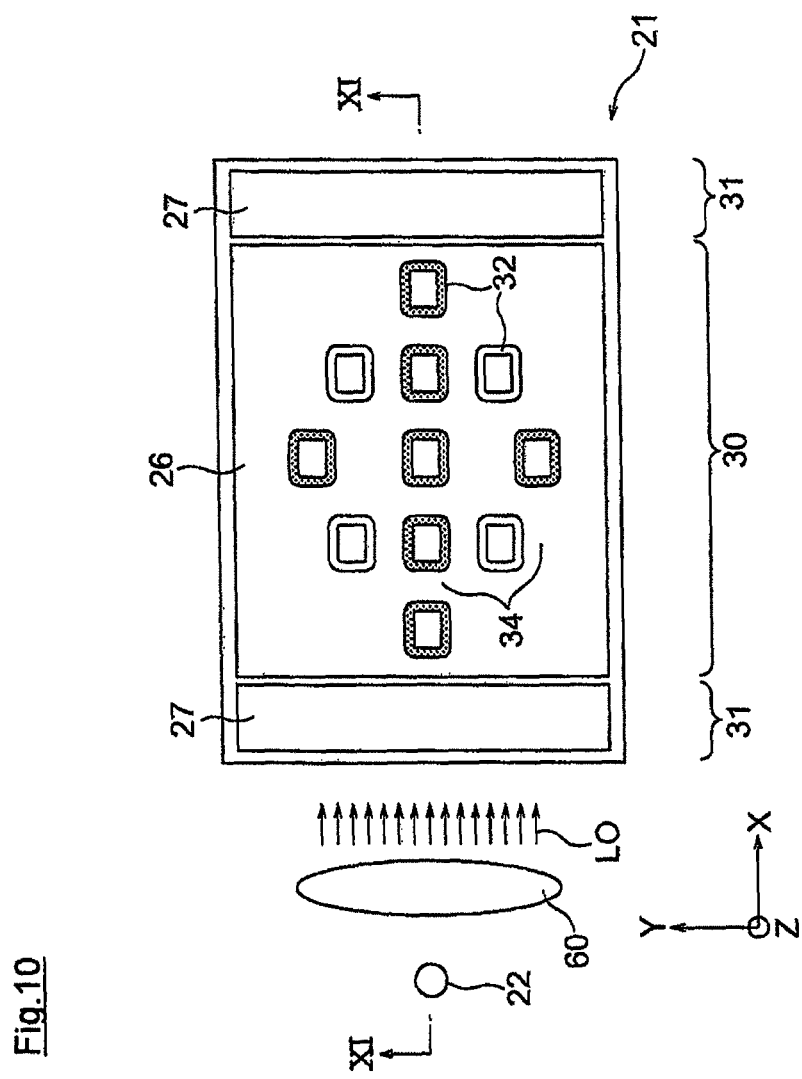
FIG. 10 is a schematic plane view showing one instantaneous displaying status in the display device shown in FIG. 7.
Figure 11:
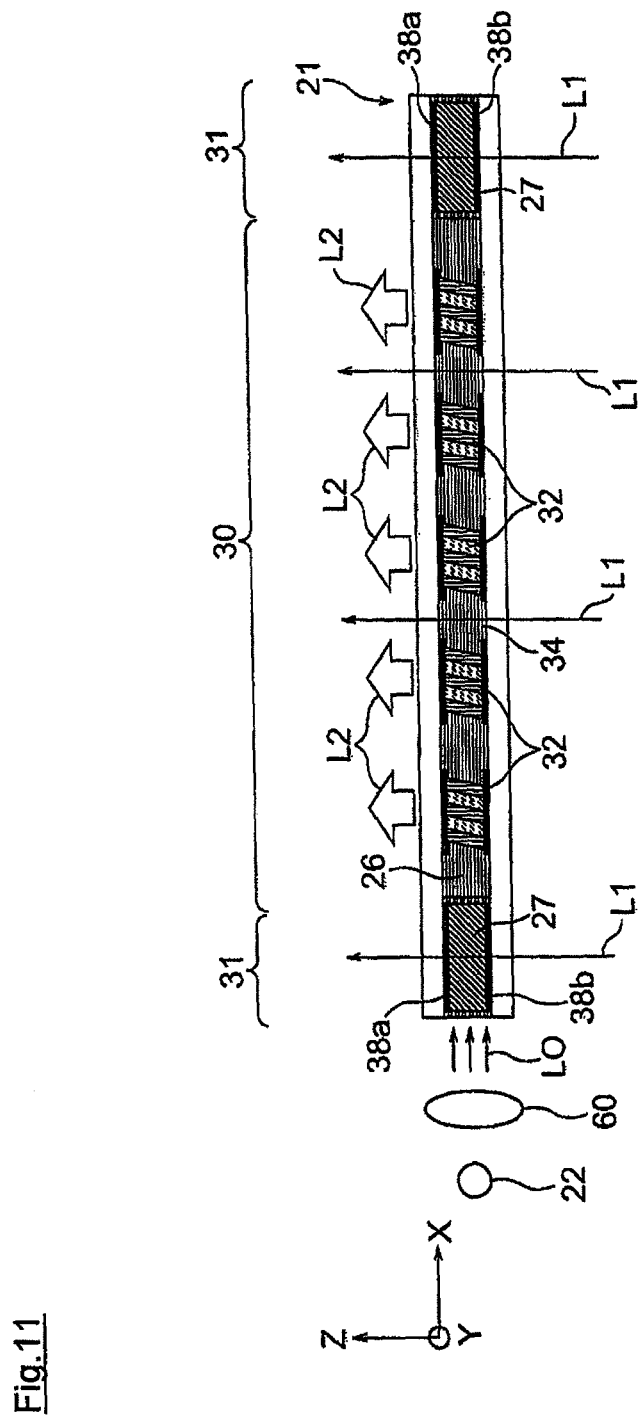
FIG. 11 is a cross sectional view along a line XI-XI of the display device shown in FIG. 10.

FIG. 10 and FIG. 11 show displaying statuses of the optical element 21 in a status that the respective pulses are ON. The light source 22 lights, the illuminating light L0 which is changed as parallel bundle of rays by a filter 60 initially comes into the second optical material layer 27 located on the light source side.

Since the voltage is applied to the second optical material layer 27, said coming light L0 passes through said layer 27 toward a X-positive direction. Simultaneously, the subject light L1 passes through the second optical material layer 27 toward a Z-direction.

Since the illuminating light L0 passing through the second optical material layer 27 comes to the first optical material layer 26, a mark displaying is available as similar with the first embodiment. In FIG. 10 and FIG. 11, the voltage is not applied to seven display portions 32 align a center portion of the X-direction and a center portion of the Y-direction of the whole display portions 32 of the first optical material layer 26. Therefore, in said seven display portion 32, a mark display is lit by forming diffracted light L2 due to diffract the coming illuminating light L0. Also, as similar with the first embodiment, the subject light L1 passes though the first optical material layer.

Figure 12:
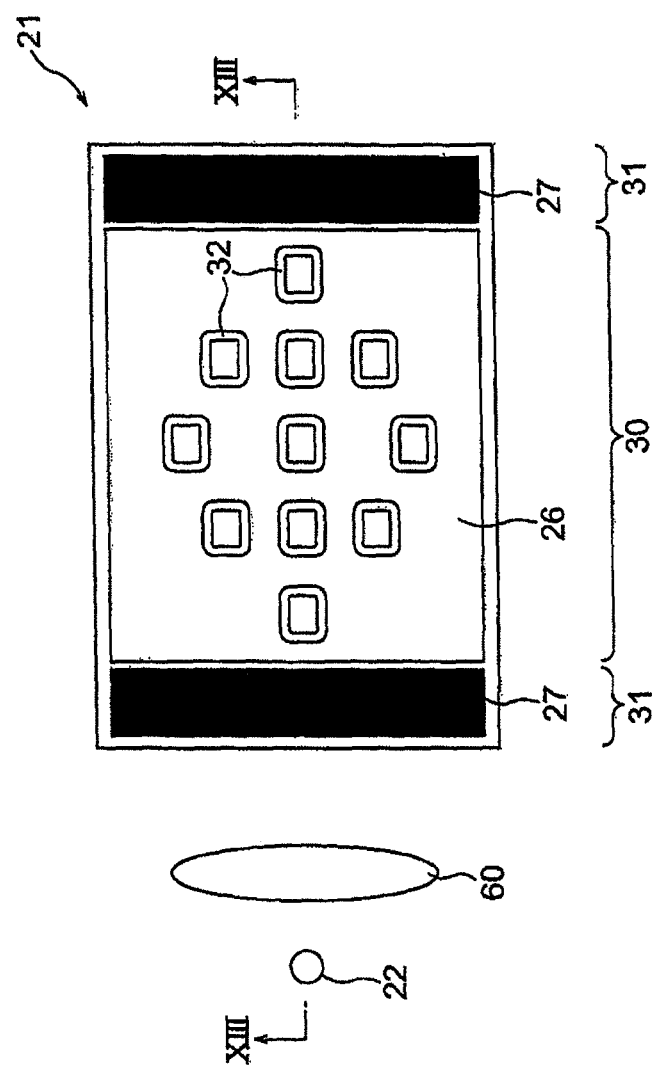
FIG. 12 is a schematic plane view showing another instantaneous displaying status in the display device shown in FIG. 7.
Figure 13:
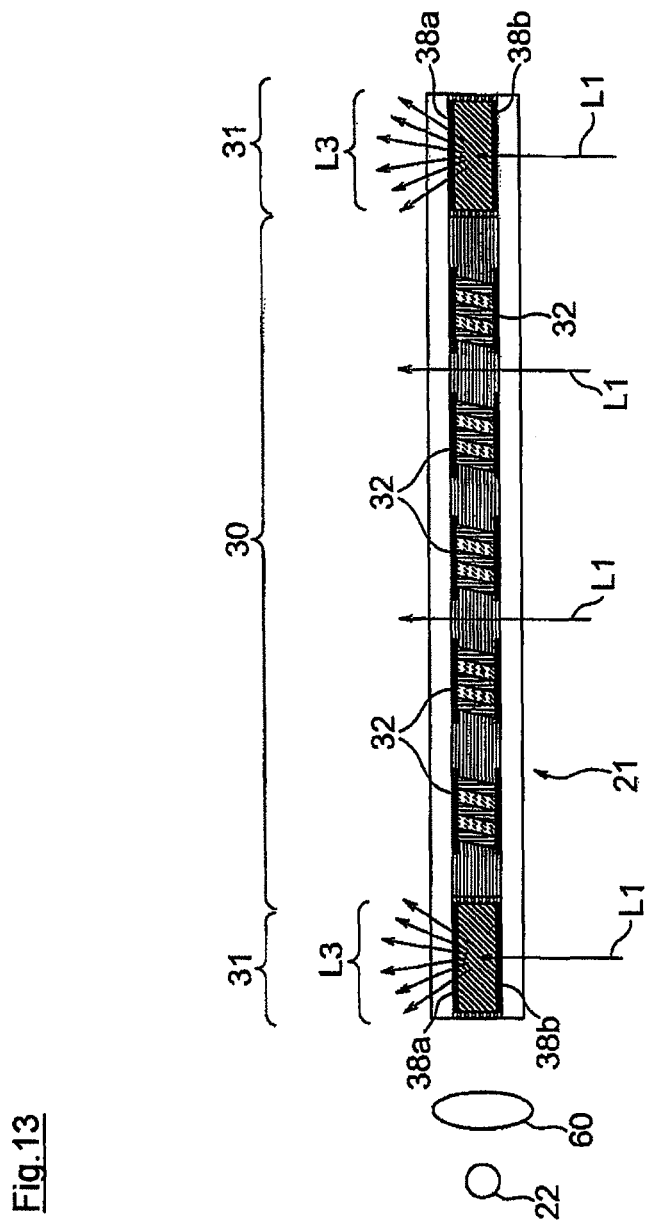
FIG. 13 is a cross sectional view along a line XIII-XIII of the display device shown in FIG. 12.

FIG. 12 and FIG. 13 show a displaying status of the optical element 21 in a status that the respective pulses are OFF. The light source 22 does not light and the illuminating light entering the optical element 21 does not exist.

The second optical material layer is a status that the voltage is not applied, and scatters the subject light L1. Therefore, the optical element 21 displays a portion corresponding to the second optical material layer 27 as a black or gray color.

The subject light L1 passes through the first optical material layer 26, and whole display portions 32 do not light the mark displaying.

As a result, the optical element 21 in the second embodiment becomes a displaying status shown in FIG. 7 and FIG. 8, by repeating displaying status of FIG. 10 and FIG. 11 and displaying status shown in FIG. 12 and FIG. 13 at a frequency of the pulse applied in the normal mode.

As shown in FIG. 7 and FIG. 8, because the second optical material layer 27 scatters/shields the subject light L1 at pulse frequency, the view control area 31 is displayed as a black or gray color. Therefore, a photographer who observes from an eyepiece lens recognizes the normal display area 30 only as a view scope, wherein the subject light L1 is constantly passes.

In the normal display area 30, the display portion 32 to which the voltage is not applied forms the diffracted light L2 at an applied pulse frequency so as to perform the mark displaying. Also, the first optical material layer 26 passes the subject light L1 constantly. Thereby, said mark displaying is displayed as layered to a subject image so that so-called superimpose display becomes available in the normal display area 30.

Note that, in the display element according to the second embodiment, when performing the superimpose display at the panorama mode, a problem such as the normal mode is not occurred, it can be performed as similar with the first embodiment, thus specification is omitted.

By making such constitution, constraints with respect to a positional relation of the light source 22 and the respective optical material layers 26, 27 can be reduced, design freedom becomes higher. Namely, a ratio of the normal display area 30 can widely be designed and the viewing area can be enlarged. Also, by locating the light source 22 to the most appropriate empty space, it is possible to contribute for downsizing a camera.

ANOTHER EMBODIMENT

In another embodiment, the second optical material layer 27 may be a diffractive optical element. In this case, the second optical material layer 27 causes to diffract the subject light L1 other than a direction towards the eyepiece lens 18, a view controlling can be realized. Namely, light coming to the second optical material layer 27 may be exit to a direction different from the subject light L1 which passes the first optical material layer 26.

Also, photographic modes selected by the viewing control are not limited to the panorama mode and the normal mode, two photographic modes composed of arbitral aspect ratio may be selected. Further, a viewing area only may be switched without changing the aspect ratio. Also, it may be selectable more than three kind of photographic modes.

As for other mode for shooting with limiting the viewing area, there is a high speed continuous shooting mode. By performing image data processing based on photographic signals of a shooting area corresponding to a limited viewing area of whole photographic signals output by imaging device, an image size becomes smaller as the shooting area small, thus, the image data processing can be performed at high speed. Therefore, the high speed continuous shooting may be available.

The invention claimed is:

1. A display device, comprising;
a first optical material layer which is arranged between a pair of transparent base plates and transmits light coming from one surface of said base plate to another surface,
an area arranged in said first optical material layer, available to output light coming from a side surface between said pair of base plates through said another surface, and
a second optical material layer arranged between said pair of base plates adjacent to said first optical material layer and available to switch status of transmitting the light coming from said one surface to said another surface, and a status of scattering the light to output through said another surface, or a status of outputting the light in a direction different from the light transmitted through said first optical material layer.

2. The display device as set forth in claim 1, wherein;
said second optical material layer is composed of an optical material different from said first optical material layer.

3. The display device as set forth in claim 1, wherein;
said area comprises a refractive diffraction grating composed of a periodic constitution of a refractive index isotropic area and a refractive index anisotropic area in a polymer-dispersed liquid crystal, and
in a status that voltage is not applied, said area is constituted to output the light coming from the side surface between said pair of base plates and output the light coming from said one surface together through said another surface.

4. The display device as set forth in claim 1, wherein;
in a status that voltage is not applied, said second optical material layer is constituted to output the light coming from said one surface through said another surface with scattering, or to output the light to a direction different from the light transmitting through said first optical material layer.

5. The display device as set forth in claim 3, wherein;
said refractive diffraction grating is formed that said refractive index isotropic area and said refractive index anisotropic area are alternately arranged in a stripe pattern along with a first direction available to output the light coming from one side face crossing with said first direction among said side faces between said pair of base plates.

6. The display device as set forth in claim 1 further comprising;
a lighting portion which generates light coming into the side face between said pair of base plates.

7. The display device as set forth in claim 6, wherein;
said second optical material layer is arranged so as not to through the light from said lighting portion.

8. The display device as set forth in claim 6, wherein;
said second optical member is arranged so as to input the light from said lighting portion into said first optical material layer after passing said second optical material layer.

9. The display device as set forth in claim 8, wherein;
a timing of generating light with said lighting portion and a switching timing of a status to said first optical material layer and said second optical material layer are made to be synchronized.

10. A viewfinder device comprising;
a display device as set forth in claim 1,
an eyepiece lens, and
an optical member which guides an object light coming from one surface of said base plates of said display device passing through to another surface.

11. A camera comprising the viewfinder as set forth in claim 10.

12. Manufacturing method for a display device comprising;
providing a first optical material layer which is arranged between a pair of transparent base plates and transmits light coming from one surface of said base plate to another surface,
providing an area arranged in said first optical material layer, available to output light coming from a side surface between said pair of base plates through said another surface, and
providing a second optical material layer arranged between said pair of base plates adjacent to said first optical material layer and available to switch status of transmitting the light coming from said one surface to said another surface, and a status of scattering the light to output through said another surface, or a status of outputting the light in a direction different from the light transmitted through said first optical material layer.

13. The manufacturing method for a display device as set forth in claim 12, wherein;
said second optical material layer is formed by an optical material different from said first optical material layer.

14. The manufacturing method for a display device as set forth in claim 12, wherein;
a refractive diffraction grating composed of a periodic constitution of a refractive index isotropic area and a refractive index anisotropic area in a polymer-dispersed liquid crystal are provided on said area, and
in a status that voltage is not applied, said area is constituted to output the light coming from the side surface between said pair of base plates and output the light coming from said one surface together through said another surface.

15. The manufacturing method for a display device as set forth in claim 12, wherein;
   in a status that voltage is not applied, said second optical material layer is provided to constitute to output the light coming from said one surface through said another surface with scattering, or to output the light to a direction different from the light transmitting through said first optical material layer.

16. The manufacturing method for a display device as set forth in claim 14, wherein;
   said refractive diffraction grating is formed that said refractive index isotropic area and said refractive index anisotropic area are alternately arranged in a stripe pattern along with a first direction available to output the light coming from one side face crossing with said first direction among said side faces between said pair of base plate.

17. The manufacturing method for a display device as set forth in claim 12 further comprising;
   providing a lighting portion which generates light coming into the side face between said pair of base plate.

18. The manufacturing method for a display device as set forth in claim 17, wherein;
   said second optical material layer is arranged so as not to through the light from said lighting portion.

19. The manufacturing method for a display device as set forth in claim 17, wherein;
   said second optical member is arranged so as to input the light from said lighting portion into said first optical material layer after passing said second optical material layer.

20. The manufacturing method for a display device as set forth in claim 19, wherein;
   a timing of generating light with said lighting portion and a switching timing of a status to said first optical material layer and said second optical material layer are made to be synchronized.

21. A manufacturing method for a viewfinder device comprising;
   providing a display device as set forth in claim 1,
   providing an eyepiece lens, and
   providing an optical member which guides an object light coming from one surface of said base plates of said display device passing through to another surface.

\* \* \* \* \*